US008264228B2

(12) United States Patent
Bittar et al.

(10) Patent No.: US 8,264,228 B2
(45) Date of Patent: Sep. 11, 2012

(54) METHOD AND APPARATUS FOR BUILDING A TILTED ANTENNA

(75) Inventors: Michael S. Bittar, Houston, TX (US); Randal T. Beste, Houston, TX (US); Vadim Yuryevich Minosyan, Houston, TX (US); Mark A. Sitka, Richmond, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 631 days.

(21) Appl. No.: 12/306,954

(22) PCT Filed: Jul. 11, 2007

(86) PCT No.: PCT/US2007/015744
§ 371 (c)(1),
(2), (4) Date: Dec. 30, 2008

(87) PCT Pub. No.: WO2008/008346
PCT Pub. Date: Jan. 17, 2008

(65) Prior Publication Data
US 2009/0309798 A1      Dec. 17, 2009

Related U.S. Application Data

(60) Provisional application No. 60/807,136, filed on Jul. 12, 2006.

(51) Int. Cl.
*G01V 3/12* (2006.01)
*G01V 3/18* (2006.01)
(52) U.S. Cl. ........................ 324/338; 324/339
(58) Field of Classification Search .................. 324/338, 324/339
See application file for complete search history.

(56) References Cited

U.S. PATENT DOCUMENTS

| 2,901,689 | A | 8/1959 | Barrett |
| 3,014,177 | A | 12/1961 | Hungerford et al. |
| 3,187,252 | A | 6/1965 | Hungerford |
| 3,510,757 | A | 5/1970 | Huston |
| 3,539,911 | A | 11/1970 | Youmans et al. |
| 3,808,520 | A | 4/1974 | Runge |

(Continued)

FOREIGN PATENT DOCUMENTS

AU      2007273026      4/2010

(Continued)

OTHER PUBLICATIONS

"Advisory Action", dated Apr. 13, 2007, U.S. Appl. No. 11/457,709, "Electromagnetic Wave Resistivity Tool Having a Tilted Antenna for Geosteering Within a Desired Payzone", filed Jul. 14, 2006.

(Continued)

*Primary Examiner* — Reena Aurora
(74) *Attorney, Agent, or Firm* — Krueger Iselin LLP

(57) ABSTRACT

Logging tools having protected tilted antennas are disclosed, along with construction methods therefor. In one method embodiment, a tilted antenna on a retrievable segment of a downhole tool is constructed by: forming an elliptical recess on the segment; forming an antenna within the elliptical recess; and forming an elliptical pattern of windows over and perpendicular to the axis of the elliptical antenna. Some tool embodiments comprise a retrievable segment of a downhole tool having an elliptical recess; an elliptical antenna disposed within the elliptical recess; and an elliptical pattern of windows formed over and perpendicular to the plane of the elliptical antenna.

20 Claims, 4 Drawing Sheets

U.S. PATENT DOCUMENTS

| | | | |
|---|---|---|---|
| 3,982,176 | A | 9/1976 | Meador |
| 4,302,722 | A | 11/1981 | Gianzero |
| 4,319,191 | A | 3/1982 | Meador et al. |
| 4,360,777 | A | 11/1982 | Segesman |
| 4,536,714 | A | 8/1985 | Clark |
| 4,553,097 | A | 11/1985 | Clark |
| 4,611,173 | A | 9/1986 | Bravenec et al. |
| 4,636,731 | A | 1/1987 | Savage et al. |
| 4,651,101 | A | 3/1987 | Barber et al. |
| 4,697,190 | A | 9/1987 | Oswald |
| 4,700,142 | A | 10/1987 | Kuckes |
| 4,780,857 | A | 10/1988 | Lyle et al. |
| 4,785,247 | A | 11/1988 | Meador et al. |
| 4,791,373 | A | 12/1988 | Kuckes |
| 4,808,929 | A | 2/1989 | Oldigs |
| RE32,913 | E | 4/1989 | Clark |
| 4,845,433 | A | 7/1989 | Kleinberg |
| 4,873,488 | A | 10/1989 | Barber et al. |
| 4,899,112 | A | 2/1990 | Clark et al. |
| 4,933,640 | A | 6/1990 | Kuckes |
| 4,940,943 | A | 7/1990 | Bartel et al. |
| 4,945,987 | A | 8/1990 | Wittrisch |
| 4,949,045 | A | 8/1990 | Clark et al. |
| 4,962,490 | A | 10/1990 | Lyle et al. |
| 4,980,643 | A | 12/1990 | Gianzero et al. |
| 5,089,779 | A | 2/1992 | Rorden |
| 5,115,198 | A | 5/1992 | Gianzero et al. |
| 5,200,705 | A | 4/1993 | Clark et al. |
| 5,210,495 | A | 5/1993 | Hapashy et al. |
| 5,230,386 | A | 7/1993 | Wu et al. |
| 5,239,448 | A | 8/1993 | Perkins et al. |
| 5,241,273 | A | 8/1993 | Luling |
| 5,243,290 | A | 9/1993 | Safinya |
| 5,260,662 | A | 11/1993 | Rorden |
| 5,278,507 | A | 1/1994 | Bartel et al. |
| 5,329,448 | A | 7/1994 | Rosthal |
| 5,332,048 | A | 7/1994 | Underwood et al. |
| 5,389,881 | A | 2/1995 | Bittar et al. |
| 5,402,068 | A | 3/1995 | Meador et al. |
| 5,428,293 | A | 6/1995 | Sinclair et al. |
| 5,442,294 | A | 8/1995 | Rorden |
| 5,485,089 | A | 1/1996 | Kuckes |
| 5,508,616 | A | 4/1996 | Sato et al. |
| 5,530,358 | A | 6/1996 | Wisler et al. |
| 5,550,473 | A | 8/1996 | Klein |
| 5,563,512 | A | 10/1996 | Mumby |
| 5,589,775 | A | 12/1996 | Kuckes |
| 5,594,343 | A | 1/1997 | Clark et al. |
| 5,656,930 | A | 8/1997 | Hagiwara |
| 5,720,355 | A | 2/1998 | Lamine et al. |
| 5,725,059 | A | 3/1998 | Kuckes et al. |
| 5,757,191 | A | 5/1998 | Gianzero |
| 5,781,436 | A | 7/1998 | Forgang et al. |
| 5,854,991 | A | 12/1998 | Gupta et al. |
| 5,886,526 | A | 3/1999 | Wu |
| 5,892,460 | A | 4/1999 | Jerabek et al. |
| 5,923,170 | A | 7/1999 | Kuckes |
| 5,999,883 | A | 12/1999 | Gupta et al. |
| 6,044,325 | A | 3/2000 | Chakravarthy et al. |
| 6,147,496 | A | 11/2000 | Strack et al. |
| 6,158,532 | A | 12/2000 | Logan et al. |
| 6,163,155 | A | 12/2000 | Bittar |
| 6,181,138 | B1 | 1/2001 | Hagiwara et al. |
| 6,191,586 | B1 | 2/2001 | Bittar |
| 6,218,841 | B1 | 4/2001 | Wu |
| 6,218,842 | B1 | 4/2001 | Bittar et al. |
| 6,297,639 | B1 | 10/2001 | Clark et al. |
| 6,304,086 | B1 | 10/2001 | Minerbo et al. |
| 6,351,127 | B1 | 2/2002 | Rosthal et al. |
| 6,353,321 | B1 | 3/2002 | Bittar |
| 6,359,438 | B1 | 3/2002 | Bittar |
| 6,373,254 | B1 | 4/2002 | Dion et al. |
| 6,466,020 | B2 | 10/2002 | Kuckes et al. |
| 6,476,609 | B1 | 11/2002 | Bittar |
| 6,538,447 | B2 | 3/2003 | Bittar |
| 6,541,979 | B2 | 4/2003 | Omeragic |
| 6,566,881 | B2 | 5/2003 | Omeragic et al. |
| 6,573,722 | B2 | 6/2003 | Rosthal et al. |
| 6,614,229 | B1 | 9/2003 | Clark et al. |
| 6,710,600 | B1 | 3/2004 | Kopecki et al. |
| 6,736,222 | B2 | 5/2004 | Kuckes et al. |
| 6,777,940 | B2 | 8/2004 | Macune |
| 6,788,065 | B1 * | 9/2004 | Homan et al. ................ 324/338 |
| 6,810,331 | B2 | 10/2004 | Bittar et al. |
| 6,863,127 | B2 | 3/2005 | Clark et al. |
| 6,885,943 | B2 | 4/2005 | Bittar et al. |
| 6,900,640 | B2 | 5/2005 | Fanini et al. |
| 6,911,824 | B2 | 6/2005 | Bittar |
| 6,944,546 | B2 | 9/2005 | Xiao et al. |
| 6,958,610 | B2 | 10/2005 | Gianzero |
| 7,019,528 | B2 | 3/2006 | Bittar |
| 7,038,455 | B2 | 5/2006 | Beste et al. |
| 7,046,010 | B2 | 5/2006 | Hu et al. |
| 7,138,803 | B2 | 11/2006 | Bittar |
| 7,202,670 | B2 | 4/2007 | Omeragic et al. |
| 7,227,363 | B2 | 6/2007 | Gianzero et al. |
| 7,265,552 | B2 | 9/2007 | Bittar |
| 7,345,487 | B2 | 3/2008 | Bittar et al. |
| 7,394,257 | B2 | 7/2008 | Martinez et al. |
| 7,427,863 | B2 | 9/2008 | Bittar |
| 7,557,579 | B2 * | 7/2009 | Bittar ........................... 324/337 |
| 7,557,580 | B2 | 7/2009 | Bittar |
| 7,657,377 | B2 | 2/2010 | Sinclair et al. |
| 7,659,722 | B2 * | 2/2010 | Bittar ........................... 324/337 |
| 7,786,733 | B2 | 8/2010 | Seydoux et al. |
| 7,848,887 | B2 | 12/2010 | Yang et al. |
| 7,948,238 | B2 * | 5/2011 | Bittar ........................... 324/337 |
| 2003/0051914 | A1 | 3/2003 | Bittar |
| 2003/0055565 | A1 | 3/2003 | Omeragic |
| 2003/0076107 | A1 | 4/2003 | Fanini et al. |
| 2003/0229450 | A1 | 12/2003 | Strickland |
| 2004/0061622 | A1 | 4/2004 | Clark |
| 2004/0196047 | A1 | 10/2004 | Fanini et al. |
| 2005/0006090 | A1 | 1/2005 | Chemali et al. |
| 2005/0024060 | A1 | 2/2005 | Bittar |
| 2005/0083063 | A1 | 4/2005 | Omeragic et al. |
| 2005/0140373 | A1 | 6/2005 | Li et al. |
| 2005/0218898 | A1 | 10/2005 | Fredette et al. |
| 2006/0011385 | A1 | 1/2006 | Seydoux et al. |
| 2006/0015256 | A1 | 1/2006 | Hassan et al. |
| 2006/0125479 | A1 | 6/2006 | Chemali et al. |
| 2006/0244455 | A1 | 11/2006 | Bittar |
| 2007/0278008 | A1 | 12/2007 | Kuckes et al. |
| 2008/0018895 | A1 | 1/2008 | Opsal |
| 2008/0136419 | A1 | 6/2008 | Seydoux et al. |
| 2009/0015260 | A1 | 1/2009 | Bittar |

FOREIGN PATENT DOCUMENTS

| | | |
|---|---|---|
| EP | 0527089 | 2/1993 |
| EP | 0814349 | 12/1997 |
| EP | 0840142 | 5/1998 |
| EP | 0093519 | 7/1999 |
| EP | 1315984 | 1/2011 |
| EP | 115343 | 3/2011 |
| RU | 2279697 | 10/2003 |
| RU | 2305300 | 8/2007 |
| WO | WO9800733 | 1/1998 |
| WO | WO0155748 | 8/2001 |
| WO | WO03/069120 | 8/2003 |

OTHER PUBLICATIONS

"Advisory Action", dated Sep. 15, 2005, U.S. Appl. No. 10/616,429, "Electromagnetic Wave Resistivity Tool Having a Tilted Antenna for Geosteering Within a Desired Payzone", filed Jul. 9, 2003.

"Canadian Office Action", dated Jun. 7, 2005, Application No. 2,415,563, "Electromagnetic Wave Resistivity Tool With a Tilted Antenna", filed Jul. 10, 2001.

"Canadian Office Action", dated Jan. 23, 2009, Application No. 2,415,563, "Electromagnetic Wave Resistivity Tool With a Tilted Antenna", filed Jan. 10, 2001.

"Canadian Office Action", dated Jan. 29, 2007, Application No. 2,415,563, "Electromagnetic Wave Resistivity Tool With a Tilted Antenna", filed Jul. 10, 2001.

"Canadian Office Action", dated Jul. 21, 2003, Appl No. 2,359,371, "Electromagnetic Wave Resistivity Tool Having a Tilted Antenna for Determining the Horizontal and Vertical Resistivities and Relative Dip Angle in Anisotropic Earth Formations", Jan. 24, 2000.
"Canadian Office Action", dated Nov. 1, 2007, Application No. 2,415,563, "Electromagnetic Wave Resistivity Tool With a Tilted Antenna", filed Jan. 10, 2001.
"European Office Action", dated Jul. 17, 2006, Appl No. 01962294.3, "Electromagnetic Wave Resistivity Tool Having a Tilted Antenna for Determining the Horizontal and Vertical Resistivities and Relative Dip Angle in Anisotropic Earth Formations", filed Jul. 10, 2001.
"European Office Action", dated Apr. 29, 2008, Application No. 00908351.0, "Electromagnetic Wave Resistivity Tool Having Tilted Antenna", filed Jan. 24, 2000.
"European Office Action", dated Jul. 31, 2007, Application No. 00908351.0, "Electromagnetic Wave Resistivity Tool Having a Tilted Antenna for Determining the Horizontal and Vertical Resistivities and Relative Dip Angle in Anisotropic Earth Formations" filed Jan. 24, 2000.
"European Office Action", dated Jul. 31, 2007, Application No. 00908351.0, "Electromagnetic Wave Resistivity Tool Having Tilted Antenna", filed Jan. 24, 2000.
"European Office Action", dated Sep. 13, 2007, Application No. 01962294.3, "Electromagnetic Wave Resistivity Tool Having a Tilted Antenna for Determining the Horizontal and Vertical Resistivities and Relative Dip Angle in Anisotropic Earth Formations", filed Jul. 10, 2001.
"European Office Action", dated Sep. 23, 3008, Application No. 01096 294.3, Electromagnetic wave resistivity tool having a tilted antenna for determining the horizontal and vertical resistivities and relative dip angle in anisotropic earth formations Jul. 10, 2001.
"European Office Action", dated Jul. 17, 2006, Application No. 01 096 294.3 , Electromagnetic wave resistivity tool having a tilted antenna for determining the horizontal and vertical resistivities and relative dip angle in anisotropic earth formations, Jul. 10, 2001.
"European Supplemental Search Report", dated Jun. 12, 2003 Application No. 00908351.0, "Electromagnetic Wave Resistivity Tool Having a Tilted Antenna for Determining the Horizontal and Vertical Resistivities and Relative Dip Angle in Anisotropic Earth Formations", filed Jan. 24, 2000.
"Eurpoean Office Action", dated Sep. 27, 2005, Application No. 01962294.3, "Electromagnetic Wave Resistivity Tool Having a Tilted Antenna for Determining the Horizontal and Vertical Resistivities and Relative Dip Angle in Anisotropic Earth Formations", filed Jul. 10, 2001.
"PCT International Preliminary Examination Report", dated Nov. 4, 2002, Application No. PCT/US01/41319 "Electromagnetic Wave Resistivity Tool Having a Tilted Antenna for Geosteering Within a Desired Payzone", filed Jul. 10, 2001.
"PCT International Search Report and Written Opinion", dated May 15, 2000, Application No. PCT/US00/01693, "Electromagnetic Wave Resistivity Tool Having a Tilted Antenna for Determining the Horizontal and Vertical Resistivities and Relative Dip Angle in Anisotropic Earth Formations", Jan. 24, 200.
"PCT International Search Report", dated Jan. 31, 2008, Application No. PCT/US07/15806, "Modular Geosteering Tool Assembly", filed Jul. 11, 2007.
"PCT International Search Report", dated Feb. 5, 2008, Application No. PCT/US07/64221, "Robust Inversion Systems and Methods for Azimuthally Sensitive Resistivity Logging Tools", filed Mar. 16, 2007.
"PCT International Search Report", dated Feb. 27, 2008, Application No. PCT/US07/75455, "Resistivity Logging with Reduced Dip Artifacts", filed Aug. 8, 2007.
"PCT International Search Report", dated Apr. 30, 2008, Application No. PCT/US06/62149, Antenna Coupling Component Measurement Tool Having a Rotating Antenna Configuration, filed Dec. 15, 2006.
"PCT International Search Report", dated May 15, 2002, Application No. PCT/US00/01693, Electromagnetic Wave Resistivity Tool Having a Tilted Antenna for Determining the Horizontal and Vertical Resistivities and Relative Dip Angle in Anisotropic Earth Formations, filed Jan. 24, 2000.

"PCT International Search Report", dated May 15, 2008, Application No. PCT/US07/15744, "Method and Apparatus for Building a Tilted Antenna", filed Jul. 11, 2007.
"PCT International Search Report", dated Sep. 18, 2001, Application No. PCT/US01/41319 "Electromagnetic Wave Resistivity Tool Having a Tilted Antenna for Geosteering Within a Desired Payzone", filed Jul. 10, 2001.
"PCT International Search Report", dated Sep. 18, 2001, Application No. US01/41319, "Electromagnetic Wave Resistivity Tool Having a Tilted Antenna for Determining the Horizontal and Vertical Resistivities and Relative Dip Angle in Anisotropic Earth Formations", filed Aug. 6, 2002.
"PCT Written Opinion", dated Aug. 6, 2002, International Application No. PCT/US01/41319, "Electromagnetic Wave Resistivity Tool Having a Tilted Antenna for Geosteering Within a Desired Payzone", filed Jul. 10, 2001.
"US Final Office Action", dated Jan. 19, 2007, U.S. Appl. No. 11/457,709, "Electromagnetic Wave Resistivity Tool Having a Tilted Antenna for Geosteering Within a Desired Payzone", filed Jul. 14, 2006.
"US Final Office Action", dated Jun. 6, 2005, U.S. Appl. No. 10/616,429, "Electromagnetic Wave Resistivity Tool Having a Tilted Antenna for Geosteering Within a Desired Payzone", filed Jul. 9, 2003.
"US Final Office Action", dated Jun. 16, 2004, U.S. Appl. No. 10/255,048, "Electromagnetic Wave Resistivity Tool Having a Tilted Antenna for Determining the Horizontal and Vertical Resistivities and Relative Dip Angle in Anisotropic Earth Formations", filed Sep. 25, 2002.
"US Non-Final Office Action", dated Feb. 24, 2009, U.S. Appl. No. 12/127,634, "Electromagnetic Wave Resistivity Tool Having a Tilted Antenna for Determining the Horizontal and Vertical Resistivities and Relative Dip Angle in Anisotropic Earth Formations", filed May 27, 2008.
"US Non-Final Office Action", dated Apr. 26, 2000, U.S. Appl. No. 09/23832, "Electromagnetic Wave Resistivity Tool Having a Tilted Antenna for Determining the Horizontal and Vertical Resistivities and Relative Dip Angle in Anisotropic Earth Formations", filed Jan. 28, 1999.
"US Non-Final Office Action", dated Jul. 28, 2003, U.S. Appl. No. 10/255,048, "Electromagnetic Wave Resistivity Tool Having a Tilted Antenna for Determining the Horizontal and Vertical Resistivities and Relative Dip Angle in Anisotropic Earth Formations", filed Sep. 25, 2002.
"US Non-Final Office Action", dated Sep. 6, 2007, U.S. Appl. No. 11/745,822, Electromagnetic Wave Resistivity Tool Having a Tilted Antenna for Geosteering Within a Desired Payzone:, filed May 8, 2007.
"US Non-Final Office Action", dated Dec. 21, 2005, U.S. Appl. No. 11/198,066, "Electromagnetic Wave Resistivity Tool Having a Tilted Antenna for Determining the Horizontal and Vertical Resistivities and Relative Dip Angle in Anisotropic Earth", filed Aug. 5, 2005.
"US Non-Final Office Action", dated Aug. 18, 2006, U.S. Appl. No. 11/457,709, "Electromagnetic Wave Resistivity Tool Having a Tilted Antenna for Geosteering Within a Desired Payzone", filed Jul. 14, 2006.
Bell, C. et al., "Navigating and Imaging in Complex Geology With Azimuthal Propagation Resistivity While Drilling", 2006 SPE Annual Technical Conference and Exhibition, SPE 102637, San Antonio, TX, USA, (Sep. 24, 2006),pp. 1-14.
Bittar, Michael S., "Processing Resistivity Logs", U.S. Appl. No. 60/821,721, filed Aug. 8, 2006.
Bittar, Michael S., "Tool for Azimuthal Resistivity Measurement and Bed Boundary Detection", U.S. Appl. No. 60/821,988, filed Aug. 10, 2006.
Bittar, Michael S., et al., "A True Multiple Depth of Investigation Electromagnetic Wave Resistivity Sensor: Theory, Experiment, and Prototype Field Test Results", SPE 22705, 66th Annual Technical Conference and Exhibition of the SPE, Dallas, TX, (Oct. 6, 1991), pp. 1-8, plus 10 pgs. of Figures.

Bittar, Michael S., et al., "Invasion Profiling with a Multiple Depth of Investigation, Electromagnetic Wave Resistivity Sensor", SPE 28425, 69th Annual Technical Conference and Exhibition of the SPE, New Orleans, LA, (Sep. 25, 1994), pp. 1-12, plus 11 pgs. of Figures.

Bittar, Michael S., et al., "The Effects of Rock Anisotropy on MWD Electromagnetic Wave Resistivity Sensors", The Log Analyst, (Jan. 1996), pp. 20-30.

Bittar, Michael S., et al., "The Effects of Rock Anisotropy on MWD Electromagnetic Wave Resistivity Sensors", SPWLA 35th Annual Logging Symposium, Jun. 19-22, 1994, (Jun. 19, 1994), 18 pgs.

Bittar, Michael S., "A New Azimuthal Deep-Reading Resistivity Tool for Geosteering and Advanced Formation Evaluation", 2007 SPE Annual Technical Conference and Exhibition, SPE 109971, Anaheim, CA, USA, (Nov. 11, 2007), pp. 1-9.

Bittar, Michale S., PCT Application US2007/075455, filed Aug. 8, 2007, Resistivity Logging with Reduced Dip Artifacts.

Bonner, S. et al., "A New Generation of Electrode Resistivity Measurements for Formation Evaluation While Drilling", SPWLA 35th Annual Logging Symposium, (Jun. 19, 1994), pp. 1-19.

Clark, Brian et al., "A Dual Depth Resistivity Measurement for Fewd", SPWLA 29th Annual Logging Symposium, (Jun. 1988), 25 pgs.

Clark, Brian et al., "Electromagnetic Propagation Logging While Drilling: Theory and Experiment", SPE Formation Evaluation, (Sep. 1990), pp. 263-271.

Hagiwara, T. "A New Method to Determine Horizontal-Resistivity in Anisotropic Formations Without Prior Knowledge of Relative Dip", 37th Annual SPWLA Logging Symposium, New Orleans, LA, (Jun. 16, 1996), pp. 1-5, plus 3 pgs. of Figures.

Li, Qiming et al., "New Directional Electromagnetic Tool for Proactive Geosteering and Accurate Formation Evaluation While Drilling", SPWLA 46th Annual Logging Symposium, New Orleans, LA, USA, (Jun. 26, 2005), pp. 1-16.

Luling, M. et al., "Processing and Modeling 2-MHz Resistivity Tools in Dipping, Laminated, Anisotropic Formations: SPWLA", SPWLA 35th Annual Logging Symposium, paper QQ, (1994), pp. 1-25.

Mack, S. G., et al., "MWD Tool Accurately Measures Four Resistivities", Oil & Gas Journal, (May 25, 1992), pp. 1-5.

Mechetin, V. F., et al., "Temp—A New Dual Electromagnetic and Laterolog Apparatus—Technological Complex", All-Union Research Logging Institute, Ufa, USSR. Ch. Ostrander, Petro Physics Int'l, Dallas, Texas, USA, 17 pgs.

Meyer, W. H., "New Two Frequency Propagation Resistivity Tools", SPWLA 36th Annual Logging Symposium, (Jun. 26-29, 1995),12 pgs.

Rodney, Paul F., et al., "Electromagnetic Wave Resistivity MWD Tool", SPE Drilling Engineering, (Oct. 1986), pp. 37-346.

Bittar, Michael S., "Electromagnetic Wave Resistivity Tool Having a Tilted Antenna for Determining the Horizontal and Vertical Resistivities and Relative Dip Angle in Anisotropic Earth Formations", U.S. Appl. No. 09/238,832, filed Jan. 28, 1999, 32 pgs.

Bittar, Michael S., "Electromagnetic Wave Resistivity Tool Having a Tilted Antenna for Determining the Horizontal and Vertical Resistivities and Relative Dip Angle in Anisotropic Earth Formations", U.S. Appl. No. 12/127,634, filed May 28, 2008, 32 pgs.

Bittar, Michael S., "Electromagnetic Wave Resistivity Tool Having a Tilted Antenna for Determining the Horizontal and Vertical Resistivities and Relative Dip Angle in Anisotropic Earth Formations", U.S. Appl. No. 12/467,427, filed May 18, 2009, 30 pgs.

Bittar, Michael S., "Electromagnetic Wave Resistivity Tool Having a Tilted Antenna for Geosteering Within a Desired Payzone", U.S. Appl. No. 09/615,501, filed Jul. 13, 2000, 70 pgs.

Bittar, Michael S., "Electromagnetic Wave Resistivity Tool Having a Tilted Antenna for Geosteering Within a Desired Payzone", U.S. Appl. No. 10/255,048, filed Sep. 25, 2002, 71 pgs.

Bittar, Michael S., "Electromagnetic Wave Resistivity Tool Having a Tilted Antenna for Geosteering Within a Desired Payzone", U.S. Appl. No. 10/616,429, filed Jul. 9, 2003, 71 pgs.

Bittar, Michael S., "Electromagnetic Wave Resistivity Tool Having a Tilted Antenna for Geosteering Within a Desired Payzone", U.S. Appl. No. 11/457,709, filed Jul. 14, 2006, 70 pgs.

Bittar, Michael S., "Electromagnetic Wave Resistivity Tool Having a Tilted Antenna for Geosteering Within a Desired Payzone", U.S. Appl. No. 11/745,822, filed May 8, 2007, 20 pgs.

Bittar, Michael S., "Electromagnetic Wave Resistivity Tool Having a Tilted Antenna for Geosteering Within a Desired Payzone", U.S. Appl. No. 12/127,672, filed May 27, 2008, 44 pgs.

Bittar, Michael S., "Electromagnetic Wave Resistivity Tool Having a Tilted Antenna for Geosteering Within a Desired Payzone", U.S. Appl. No. 12/467,434, filed May 18, 2009, 40 pgs.

Bittar, Michael S., et al., "A 3D Borehole Imager and a Dielectric Measurement Tool", PCT App No. US09/65537, filed Nov. 23, 2009, 13 pgs.

Bittar, Michael S., et al., "Antenna Coupling Component Measurement Tool Having a Rotating Antenna Configuration", PCT Appl No. US06/062149, filed Dec. 15, 2006, 26 pgs.

Bittar, Michael S., et al., "Antenna Coupling Component Measurement Tool Having a Rotating Antenna Configuration", U.S. Appl. No. 12/294,557, filed Sep. 5, 2008, 22 pgs.

Bittar, Michael S., et al., "EM-Guided Drilling Relative to an Existing Borehole", U.S. Appl. No. 12/526,552, filed Aug. 10, 2009, 13 pgs.

Bittar, Michael S., et al., "Int'l Search Report and Written Opinion", dated Oct. 8, 2009, Appl No. PCT/US09/053354, "A High Frequency Dielectric Measurement Tool", filed Aug. 11, 2009, 11 pgs.

Bittar, Michael S., et al., "Look-Ahead Boundary Detection and Distance Measurement", U.S. Appl. No. 12/067,582, filed Mar. 20, 2009, 16 pgs.

Bittar, Michael S., et al., "Method and Apparatus for Building a Tilted Antenna", U.S. Appl. No. 12/306,954, filed Dec. 30, 2008, 13 pgs.

Bittar, Michael S., et al., "Method and Apparatus Having Antennas Configured to Measure Electrical Anisotropy", U.S. Appl. No. 12/088,061, filed Mar. 25, 2009, 16 pgs.

Bittar, Michael S., et al., "Modular Geosteering Tool Assembly", U.S. Appl. No. 12/306,267, filed Dec. 23, 2008, 16 pgs.

Bittar, Michael S., et al., "Multimodal Geosteering Systems and Methods", U.S. Appl. No. 12/679,502, filed Mar. 23, 2010, 20 pgs.

Bittar, Michael S., et al., "Systems and Methods for Displaying Logging Data", U.S. Appl. No. 12/295,158, filed Sep. 29, 2008, 15 pgs.

Bittar, Michael S., et al., "Systems and Methods Having Radially Offset Antennas for Electromagnetic Resistivity Logging", U.S. Appl. No. 12/300,876, filed Nov. 14, 2008, 16 pgs.

EP Non-Final Office Action, dated Dec. 30, 2009, Appl No. 01 962 294.03, Electromagnetic Wave Resistivity Tool Having a Tilted Antenna for Geosteering Within a Desired Payzone, filed Jul. 1, 2001, 3 pgs.

First Chinese Office Action, dated Mar. 10, 2011, Appl No. 200780024362.2, "Method and Apparatus for Building a Tilted Antenna", filed Dec. 29, 2008, 13 pgs.

Gianzero, Stanley et al., "Method and Apparatus Having Antennas Configured to Measure Electrical Anisotropy", U.S. Appl. No. 10/173,528, filed Jun. 17, 2002, 24 pgs.

Gianzero, Stanley et al., "Method and Apparatus Having Antennas Configured to Measure Electrical Anisotropy", U.S. Appl. No. 10/957,415, filed Oct. 1, 2004, 27 pgs.

Indonisia First Office Action, dated Sep. 2009, Appl No. WOO200803740, Method and Apparatus for Building a Tilted Antenna, filed Nov. 19, 2008, 2 pgs.

PCT International Preliminary Report on Patentability, dated Apr. 30, 2008, Appl No. PCT/US06/62149, "Antenna Coupling Component Measurement Tool Having a Rotating Antenna Configuration", filed Dec. 15, 2006, 6 pgs.

PCT International Preliminary Report on Patentability, dated Oct. 1, 2009, Appl No. PCT/US07/064221, "Robust Inversion Systems and Methods for Azimuthally Sensitive Resistivity Logging Tools", filed Mar. 16, 2007, 2 pgs.

PCT International Search Report and Written Opinion, dated Jun. 27, 2008, Appl No. PCT/US08/51447, EM-Guided Drilling Relative to an Existing Borehole, 8 pgs.

PCT Written Opinion of the International Searching Authority, dated Feb. 5, 2008, Appl No. PCT/US07/64221, "Robust Inversion systems and Methods for Azimuthally Sensitive Resistivity Logging Tools", filed Mar. 16, 2007, 4 pgs.

Preliminary Report on Patentability, dated Jul. 29, 2010, Appl No. PCT/US08/51447, "EM-Guided Drilling Relative to an Existing Borehole", filed Jan. 18, 2008, 7 pgs.

Singapore Examination Report, dated Oct. 28, 2010, Application No. 200808573-0, "Method and Apparatus for Building a Tilted Antenna", filed Nov. 19, 2008, 6 pgs.

US Final Office Action, dated Feb. 22, 2011, U.S. Appl. No. 12/689,435, "Tool for Azimuthal Resistivity Measurement and Bed Boundary Detection" filed Jan. 19, 2010, 10 pgs.

US Final Office Action, dated Jul. 7, 2011, U.S. Appl. No. 12/299,760, "Robust Inversion Systems and Methods for Azimuthally Sensitive Resistivity Logging Tools", filed Nov. 5, 2008, 16 pgs.

US Final Office Action, dated Oct. 15, 22010, U.S. Appl. No. 12/467,427, "Electromagnetic Wave Resistivity Tool Having a Tilted Antenna for Determing the Horizontal and Vertical Resistivities and Relative Dip Angle in Anisotropic Earth Formations", May 18, 2009, 24 pgs.

US Final Office Action, dated Oct. 22, 2010, U.S. Appl. No. 12/467,434, "Electromagnetic Wave Resistivity Tool Having a Tilted Antenna for Geosteering Within a Desired Payzone", filed May 18, 2009, 19 pgs.

US Non-Final Office Action, dated Feb. 16, 2011, U.S. Appl. No. 12/294,557, "Antenna Coupling Component Measurement Tool Having a Rotating Antenna Configuration", filed Sep. 25, 2008, 16 pgs.

US Non-Final Office Action, dated Mar. 7, 2011, U.S. Appl. No. 12/467,434, "Electromagnetic Wave Resistivity Tool Having a Tilted Antenna for Geosteering Within a Desired Payzone", filed May 18, 2009, 14 pgs.

US Non-Final Office Action, dated Mar. 15, 2010, U.S. Appl. No. 12/467,427, "Electromagnetic Wave Resistivity Tool Having a Tilted Antenna for Determining the Horizontal and Vertical Resistivities and Relative Dip Angle in Anisotropic Earth Formations", filed May 18, 2009, 25 pgs.

US Non-Final Office Action, dated Jun. 3, 2010, U.S. Appl. No. 12/467,434, "Electromagnetic Wave Resistivity Tool Having a Tilted Antenna for Geosteering Within a Desired Payzone", filed May 18, 2009, 19 pgs.

US Non-Final Office Action, dated Sep. 26, 2011, U.S. Appl. No. 12/294,557, "Antenna Coupling Component Measurement Tool Having a Rotating Antenna Configuration", filed Sep. 25, 2008, 9 pgs.

US Non-Final Office Action, dated Nov. 26, 2010, U.S. Appl. No. 12/299,760, " Robust Inversion Systems and Methods for Azimuthally Sensitive Resistivity Logging Tools", filed Nov. 5, 2008, 18 pgs.

US Non-Final Office Action, dated Dec. 23, 2010, U.S. Appl. No. 12/306,267, "Modular Geosteering Tool Assembly", filed Dec. 23, 2008, 18 pgs.

* cited by examiner

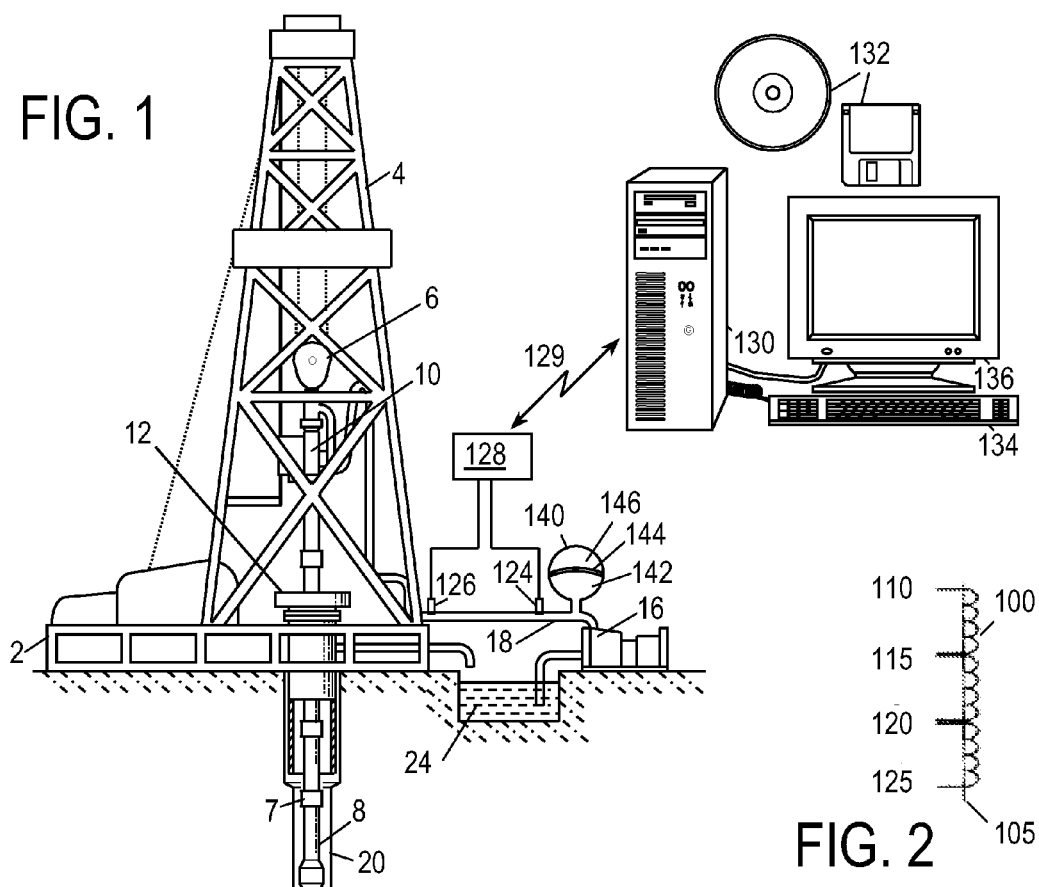
FIG. 1
FIG. 2
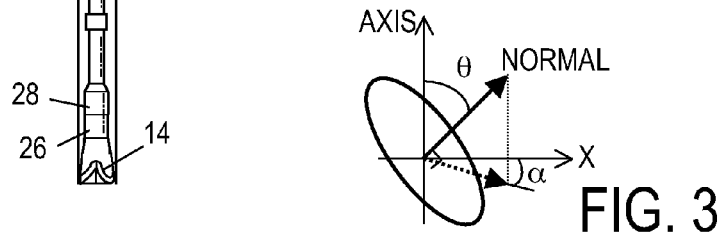
FIG. 3
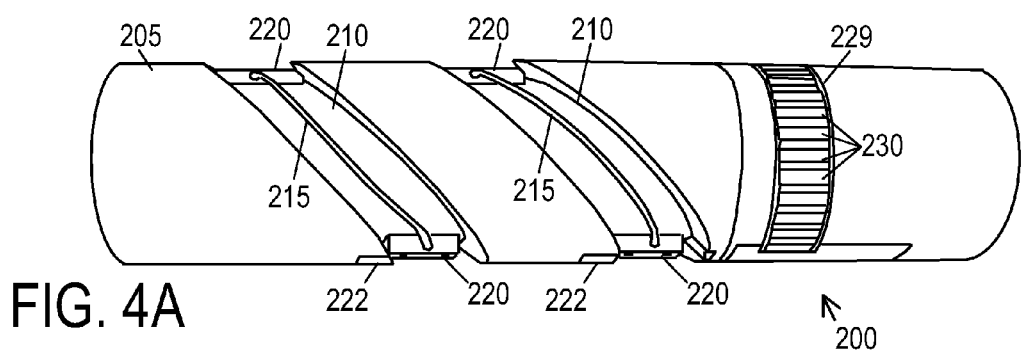
FIG. 4A

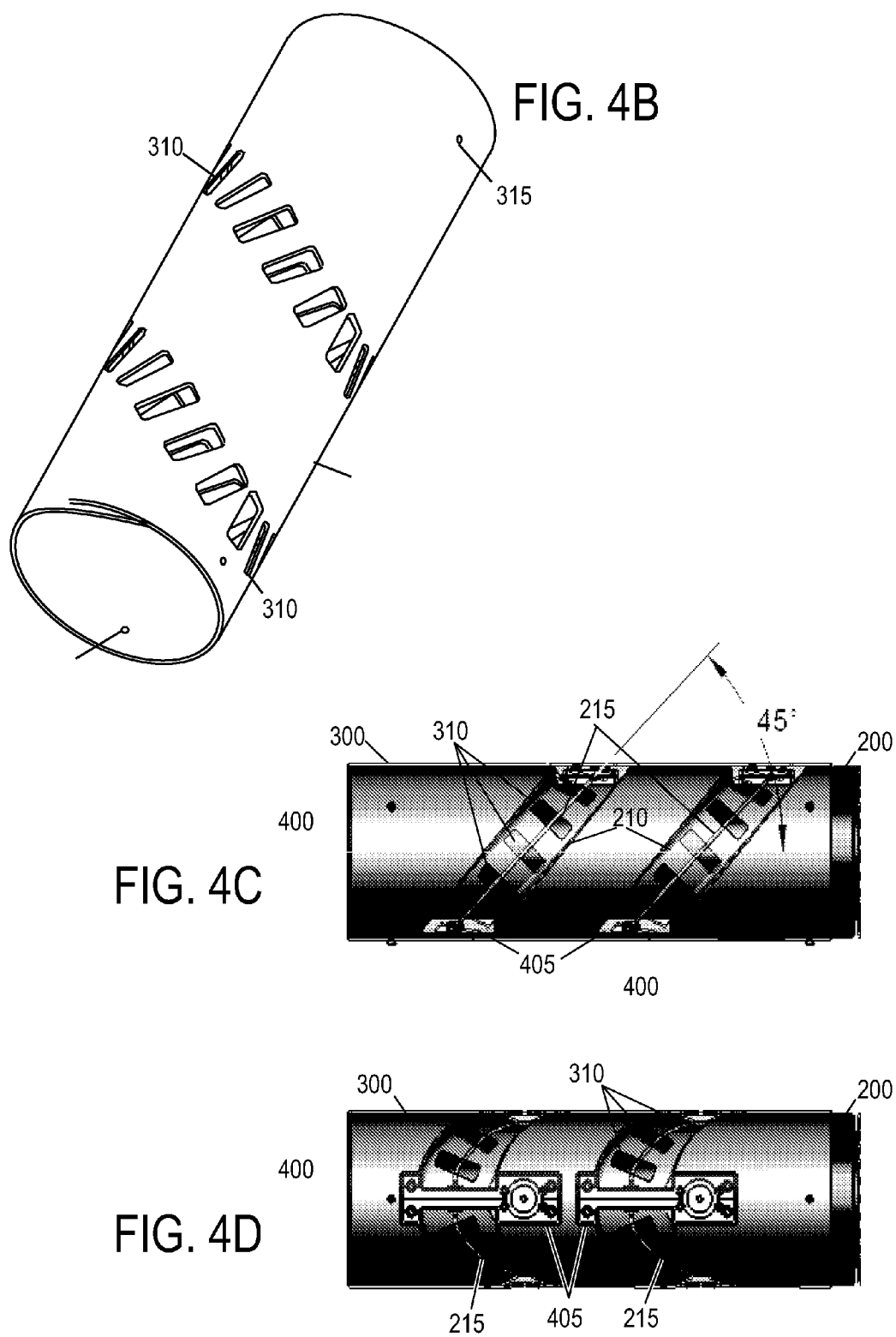

METHOD AND APPARATUS FOR BUILDING A TILTED ANTENNA

RELATED APPLICATIONS

This application claims priority to Provisional U.S. Patent Application 60/807,136, which was filed Jul. 12, 2006 by inventors Michael Bittar, Randy Beste, Vadim Minosyan, and Mark Sitka.

BACKGROUND

The gathering of downhole information has been done by the oil well industry for many years. Modern petroleum drilling and production operations demand a great quantity of information relating to the parameters and conditions downhole. Such information typically includes the location and orientation of the wellbore and drilling assembly, earth formation properties, and drilling environment parameters downhole. The collection of information relating to formation properties and conditions downhole is commonly referred to as "logging", and can be performed during the drilling process itself.

Various measurement tools exist for use in wireline logging and logging while drilling. One such tool is the resistivity tool, which includes one or more antennas for transmitting an electromagnetic signal into the formation and one or more antennas for receiving a formation response. When operated at low frequencies, the resistivity tool may be called an "induction" tool, and at high frequencies it may be called an electromagnetic wave propagation tool. Though the physical phenomena that dominate the measurement may vary with frequency, the operating principles for the tool are consistent. In some cases, the amplitude and/or the phase of the receive signals are compared to the amplitude and/or phase of the transmit signals to measure the formation resistivity. In other cases, the amplitude and/or phase of the receive signals are compared to each other to measure the formation resistivity.

In certain situations, such as when drilling through formations in which the formation boundaries extend vertically, or when drilling from an off-shore platform, it is desirable to drill wells at an angle with respect to bed boundaries in the strata. This is often termed "horizontal" drilling. When drilling horizontally, it is desirable to maintain the well bore in the pay zone (the formation which contains hydrocarbons) as much as possible so as to maximize the recovery. This can be difficult since formations may dip or divert. Thus, while attempting to drill and maintain the well bore within a particular formation, the drill bit may approach a bed boundary.

As the rotating bit approaches the bed boundary, the bed boundary will be on one side of the bit axis, i.e. in one azimuthal range with respect to the bit axis. Conventional resistivity tools are not azimuthally sensitive and hence they do not enable efficient detection and avoidance of approaching bed boundaries.

BRIEF DESCRIPTION OF THE DRAWINGS

In the ensuing detailed description, reference will be made to the accompanying drawings in which:

FIG. 1 shows an illustrative logging while drilling environment;

FIG. 2 shows a schematic of an illustrative multi-tap antenna;

FIG. 3 shows a coordinate system for defining orientation of tilted antennas;

FIG. 4A shows a partially assembled resistivity tool having tilted antennas;

FIG. 4B shows a illustrative protective cover having an elliptical pattern of windows;

FIGS. 4C-4D show different views of the protective cover in place on a resistivity tool;

Figure 5A:
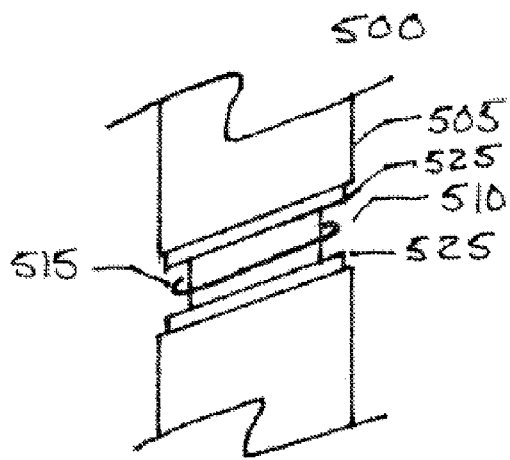
FIGS. 5A-5E show an alternative construction for protecting tilted antennas.

While the disclosed inventions are susceptible to various modifications and alternative forms, specific embodiments thereof are shown by way of example in the drawings and will herein be described in detail. It should be understood, however, that the drawings and detailed description thereto are not intended to limit the inventions to the particular form disclosed, but on the contrary, the intention is to cover all modifications, equivalents and alternatives falling within the spirit and scope of the appended claims.

Notation and Nomenclature

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical connection. Thus, if a first device couples to a second device, that connection may be through a direct electrical connection, or through an indirect electrical connection via other devices and connections. In addition, the term "attached" is intended to mean either an indirect or a direct physical connection. Thus, if a first device attaches to a second device, that connection may be through a direct physical connection, or through an indirect physical connection via other devices and connections.

DETAILED DESCRIPTION

The present application relates to a method and apparatus for building a logging while drilling (LWD) tool having one or more tilted antennas to enable azimuthally-sensitive resistivity measurements. Reference to U.S. Pat. No. 5,563,512, which is owned by Halliburton Company of Houston, Tex., may be helpful. This patent provides relevant discussion and drawings pertaining to the implementation of electromagnetic antennae in downhole tools. U.S. Pat. Nos. 6,911,824 and 6,181,138, also owned by Halliburton Company of Houston, Tex., may also be helpful. These patents provide relevant discussion and drawings pertaining to the use of tilted antennae in downhole tools.

Turning now to the figures, FIG. 1 shows a well during drilling operations. A drilling platform 2 is equipped with a derrick 4 that supports a hoist 6. Drilling of oil and gas wells is carried out by a string of drill pipes connected together by "tool" joints 7 so as to form a drill string 8. The hoist 6 suspends a top drive 10 that is used to rotate the drill string 8 and to lower the drill string through the wellhead 12. Connected to the lower end of the drill string 8 is a drill bit 14. The bit 14 is rotated and drilling accomplished by rotating the drill string 8, by use of a downhole motor near the drill bit, or by both methods. Drilling fluid is pumped by mud recirculation equipment 16 through supply pipe 18, through top drive 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer (not specifically shown), and into a mud pit 24 on the surface. On the surface, the drilling mud is cleaned and then recirculated by recirculation equipment 16. The drilling mud is used to cool the drill bit 14, to carry cuttings from the base of the bore to the surface, and to balance the hydrostatic pressure in the rock formations.

In wells employing mud pulse telemetry, downhole sensors 26 collect data regarding the formation properties and/or various drilling parameters. The downhole sensors 26 are coupled to a mud pulse telemetry transmitter 28 that transmits the data to the surface. Transmitter 28 modulates a resistance to drilling fluid flow to generate pressure pulses that propagate at the speed of sound to the surface. One or more pressure transducers 124, 126 convert the pressure signal into electrical signal(s) for a signal digitizer 128. To improve reception, a dampener or desurger 140 reduces noise from the mud recirculation equipment. Feed pipe 18 connects to a drilling fluid chamber 142 in desurger 140. A diaphragm or separation membrane 144 separates the drilling fluid chamber 142 from a gas chamber 146. The diaphragm 144 moves with variations in the drilling fluid pressure, enabling the gas chamber to expand and contract, thereby absorbing most of the pressure fluctuations.

The digitizer 128 supplies a digital form of the pressure signals to a computer 130 or some other form of a data processing device. Computer 130 operates in accordance with software (which may be stored on information storage media 132) and user input via an input device 134 to process and decode the received signals. The resulting telemetry data may be further analyzed and processed by computer 130 to generate a display of useful information on a computer monitor 136 or some other form of a display device. For example, a driller could employ this system to obtain and monitor BHA position and orientation information, drilling parameters, and formation properties.

FIG. 2 is an electrical schematic of a multi-tap antenna 100. (Note that the physical appearance of antenna 100 may be a single planar loop as shown in FIG. 3.) Antenna 100 comprises multiple coils of wire surrounding a central core 105. Leads 110, 115, 120, 125 are attached to different coils to enable the transmitter or receiver electronics to change the number of effective turns in the coil. When an alternating current is applied to coil 100, an electromagnetic field is produced. Conversely, an alternating electromagnetic field in the vicinity of antenna 100 induces a voltage at the leads. Thus, antenna 100 may be used as to transmit or receive electromagnetic waves.

FIG. 3 shows a coordinate system for specifying the orientation of an antenna. The wire loop(s) lie in a plane that is tilted at an angle relative to the tool axis. The tilt angle may be expressed as the angle $\theta$ between the tool axis and the normal to the plane. Where needed, the azimuthal orientation $\alpha$ of the antenna can be expressed as the angle between the x-axis (usually demarcated with a scribe line on the tool face) of the tool and the projection of the normal vector onto a plane perpendicular to the longitudinal axis of the tool.

FIG. 4A illustrates tilted antennae 215 and support blocks 220 disposed within elliptical recesses 210 in a segment 200 of a downhole tool. Segment 200 comprises a cylindrical body 205, two elliptical recesses 210, two tilted antennae 215, and supports 220. Segment 200 further comprises a coaxial recess 229 for a coaxial antenna protected beneath crosswise metal bars 230. Electronics for transmitting and receiving electromagnetic signals via the antennas may be contained in hermetically sealed cavities behind hatches 222. The electronics of segment 200 may process the receive signals to measure attenuation and phase shift, or alternatively, may digitize and timestamp the signals and communicate the signals to other components of the tool for such processing. Segment 200 may be part of an azimuthally sensitive resistivity tool that enables the detection of distance and direction to nearby bed boundaries or other changes in resistivity (e.g., nearby well bores).

Cylindrical body 205 may comprise, for example, a solid steel tube having portions of its interior and exterior removed in order to measure resistivity, anisotropy, and boundary direction as described more fully in the issued patents identified previously. Various known techniques may be used to remove portions of cylindrical body 205, e.g., etching, laser cutting. The shape, length, and diameter of cylindrical body 205 may vary with particular applications, e.g., cylindrical body 205 generally has an outside diameter ranging from 4.5 to 20 inches and lengths between 2 to 4 feet. Cylindrical body 205 may comprise threaded connections or other attachment mechanisms at either end for purposes of assembling the tool segments to form a tool and to incorporate the tool into a drill string.

In FIG. 4A, portions of the exterior of cylindrical body 205 are removed to form elliptical recesses 210. In the embodiment shown in FIG. 4A, elliptical recesses 210 comprise channels or grooves around the circumference of cylindrical body 205 and set at an angle with respect to the axis of the body. In the figure the elliptical recesses 210 are shown at the same angle relative to the axis of cylindrical body 205, but the number of channels, their depth, width, shape and angles relative to the axis of cylindrical body 205 may vary with the particular application that segment 200 is designed for. The depth of elliptical recesses 210 may be of various depths, e.g., generally from ⅛ inch to one inch, depending on the wall thickness of cylindrical body 205. Elliptical recesses 210 may have beveled edges, rounded or square corners, etc. While it is desirable to have the elliptical recesses inset with respect to the circumference of the cylindrical body 205 to avoid extending the radial profile of the tool, structural integrity is a countervailing factor that may dictate that the elliptical recesses be formed between raised guard bands on the surface of body 205.

As shown in FIG. 4A, antennae 215 are disposed within elliptical recesses 210 and coupled to electronics that may employ the antennas as transmitters or receivers. The antennae 215 are in a plane that is tilted at an angle relative to the tool axis. A layer of an electrically insulating material (not shown), e.g., Randallite, fiberglass-epoxy, or rubber, may be placed between antenna 215 and elliptical recess 210. Antenna 215 may be sealed or potted, i.e., entirely enclosed by the insulating material. In some other embodiments, where cylindrical body 205 is already insulated or formed of a non-conductive material (e.g., fiberglass), antennae 215 may be directly mounted without additional electrically insulative material. Nevertheless, it is preferable to maintain a gap or spacing between antennae 215 and elliptical recesses 210.

The angle of each recess of elliptical recesses 210 and each antenna of antennae 215 relative to the longitudinal axis of cylindrical body 205 may vary as desired. In some embodiments, the angle may be 45 degrees. In other embodiments, antennae 215 may be at a plurality of different angles. Antennae 215 may be adjacent other antennae on segment 200, perhaps at zero angle (i.e., co-axial with the tool). Although not shown in FIG. 4A, a plurality of antennas may be disposed within each of elliptical recesses 210.

As further shown in FIG. 4A, supports 220 are also disposed within elliptical recesses 210. The supports may serve simply as structural support to maintain a uniform gap between the antenna and the conductive tool body. In some embodiments, however, the supports may also provide electrical connections between the antenna and electrical circuitry, and in some further embodiments, may enclose the electronic circuitry. The supports may further serve to anchor the antenna and the filler material for the gap to prevent slippage that might distort the antenna configuration. In some implementations, the supports themselves may be designed to substantially fill the gap, obviating the need for any additional filler material other than perhaps a sealant. The number of supports 220 may vary from one application to the next. Supports may be formed of conductive or non-conductive material(s), or a combination thereof.

FIG. 4B illustrates a protective cover in accordance with some embodiments of the invention. A pattern of windows 310 are formed in the cover, arranged so as to be aligned with the tilted antennas 215. In some embodiments, the windows are substantially rectangular, with the edges nearest the antenna oriented generally perpendicular to the tilted antenna. When measured perpendicularly to the plane of the antenna, the window dimension should be at least one centimeter and is preferably no more than 10 or 12 centimeters. Mounting holes 315 may also be provided as a means to secure the cover to the tool segment 200. Cover 300 provides protection for at least a portion of segment 200 by acting as a rigid shell or sleeve.

Tubular body 305 may be formed of conductive or non-conductive material, or a combination thereof. In some embodiments, tubular body 305 is formed of non-magnetic steel. Tubular body 305 may be hard faced with, for example, tungsten carbide. Tubular body 305 has open ends so that it can be slipped on and off cylindrical body 205 while allowing segment 200 to be attached to a drill string at either end. The shape, thickness, diameter, and length of tubular body 305 may vary from one application to the next. Tubular body 305 may be tapered, as may be cylindrical body 205. In some embodiments, the inner diameter of tubular body 305 is the same as the outer diameter of cylindrical body 205. Tubular body 305 is preferably long enough to protect all electronics components, including antennae 215.

One or more patterns of windows 310 are formed in cover 300. Each pattern of windows 310 is designed to be aligned with an antenna identified by antennae 215. Each window is arranged with its long edges as perpendicular to the plane of antenna 215 as the cover's surface will permit. The number of windows may vary from one application to the next. The dimensions, spacing, and other characteristics of each window or each set of windows may vary from one application to the next. Structural integrity may impact the dimensions, spacing, and other characteristics. In some embodiments, each window within the pattern of windows 310 has equivalent dimensions. In some embodiments, the windows in the pattern of windows 310 are equally spaced. The edges forming windows 310 may be beveled.

Mounting holes 315 may be used to affix cover 300 to segment 200. As such, matching holes may be formed in segment 200 (not shown). Screws or other known means (not shown) may be used to join cover 300 to segment 200. Such means may be in addition to a pressure fit, weld or other supplemental method of retaining cover 300 in place over segment 200.

FIG. 4C shows the protective cover 300 in place on tool segment 200. For explanatory purposes, the cover 300 is shown as a transparent material to enable visualization of the relationship between the antennas 215 and the windows 310. The side view of covered segment 400 comprises cover 300 mated to segment 200. Elliptical recesses 210 and antennae 215 underlie the patterns of windows 310. When properly mated, windows 310 are aligned above and perpendicular to antennae 215 around the circumference of segment 200. FIG. 4C further illustrates that in some embodiments antennae 215 are aligned 45 degrees from the axis of segment 200.

FIG. 4D shows a bottom view of the protective cover 300 in place on tool segment 200. The bottom view of covered segment 400 illustrates an additional view of elliptical recesses 210, antennae 215, and windows 310 arranged perpendicular to antennae 215 around the circumference of segment 200.

In FIGS. 4C and 4D, hatches 405 in tool segment 200 are shown. A hermetically sealed cavity beneath each hatch contains electronics for transmitting and receiving signals via the corresponding antenna 215.

The volume of recesses 210 and the windows 310 and other area may be filled and sealed to prevent penetration of drilling fluid and other material. Suitable methods may include those described in U.S. Pat. No. 5,563,512. However, the sealant preferably does not substantially degrade the ability of windows 310 to pass radiated and reflected energy.

FIG. 5A illustrates an alternative elliptical recess configuration. Segment 500 comprises cylindrical body 505, elliptical recess 510, antenna 515, and shoulders 525. The primary difference between segment 200 and segment 500 is the presence of shoulders 525. Shoulders 525 support a smaller cover than cover 300.

Figure 5B:
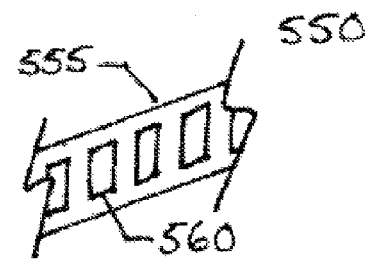

FIG. 5B illustrates a partial view of an alternative cover having a pattern of windows that aligns with the elliptical recess. Cover 550 comprises band 555 having windows 560. Cover 550 is supported by shoulders 525, and perhaps additionally any supports (not shown). Like windows 310, windows 560 are preferably aligned with and perpendicular to an antenna, in this case, antenna 515. The materials used to form cover 550 and the dimensions of cover 550 and windows 560 may vary from one implementation to the next as previously mentioned with regard to cover 300 and windows 310. Likewise, windows 560 and other area may be sealed to prevent penetration of drilling fluid and other material by any known method. Cover 550 may be affixed to segment 500 by any known method(s) of attachment, e.g., screws, compression, clamp(s). Cover 550 may comprise one or more pieces. A gasket may be affixed to cover 550 or shoulders 525.

In an alternative embodiment, the shoulders 525 may support discrete metal bars 230 interspersed with insulating material in a configuration like that shown in FIG. 4A. The gaps between the bars 230 serve as windows to permit the antenna to transmit or receive electromagnetic signals. For tilted antennas, the metal bars may be shaped to provide edges running crosswise to the antenna.

Figure 5C:
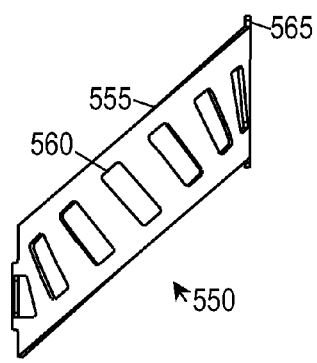
Figure 5D:
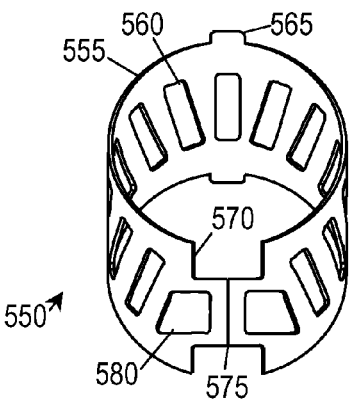

FIG. 5C shows a side view of the whole cover 550 and FIG. 5D shows a front view of the whole cover 550. The cover 550 may be cut from a flat sheet of steel and formed into a (tilted) cylindrical shape. After it has been fitted in the recess, a weld can be made along seam 575 to secure the cover in place. Tabs 565 may be provided to prevent rotation of the cover, and notches 570 may be provided to fit around access covers, securing hardware, or other tool elements. Note that window shapes need not be uniform in shape or size as indicated by window 580.

Figure 5E:
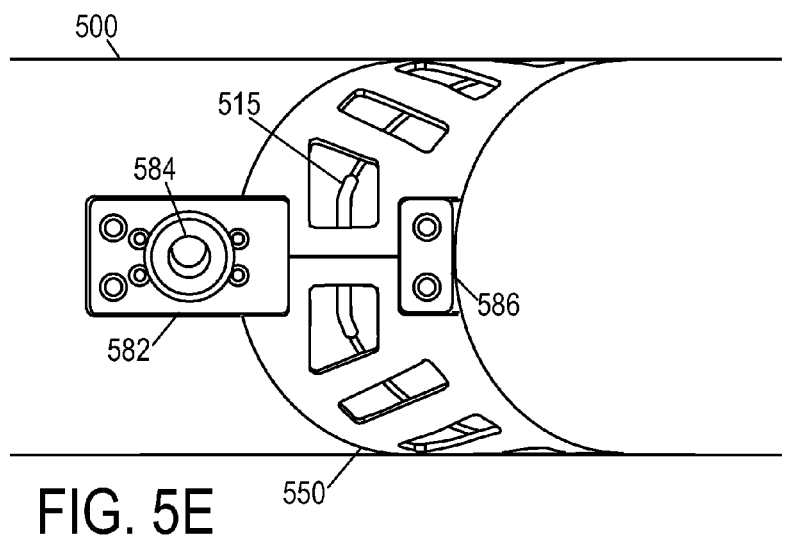

FIG. 5E shows the cover 550 in place on a partially assembled logging tool to illustrate the relationship between the antenna 515 and the windows. Within a machined recess 584 are an electronics cavity 584 and various threaded holes for securing the electronics and a hatch. A matching recess 586 with additional threaded holes allows the hatch to be secured (beneath cover 550) across the width of the antenna recess, providing a wireway between the antenna and the electronics if desired. In practice the antenna will not be visible as the elliptical recess and the cover windows will be filled with some insulating material to support and protect the antenna.

While not illustrated, windows may also be formed in or on a segment, i.e., in the walls of the segment body, passing partly or entirely through from the outer surface to the inner bore. Voids may be created between adjacent windows for passage of one or more antennae. Retainer-insulators could be fitted through voids to prevent contact with the segment, assuming it is conductive. A cover with windows may or may not be utilized with such an embodiment of the invention.

Figure 6:
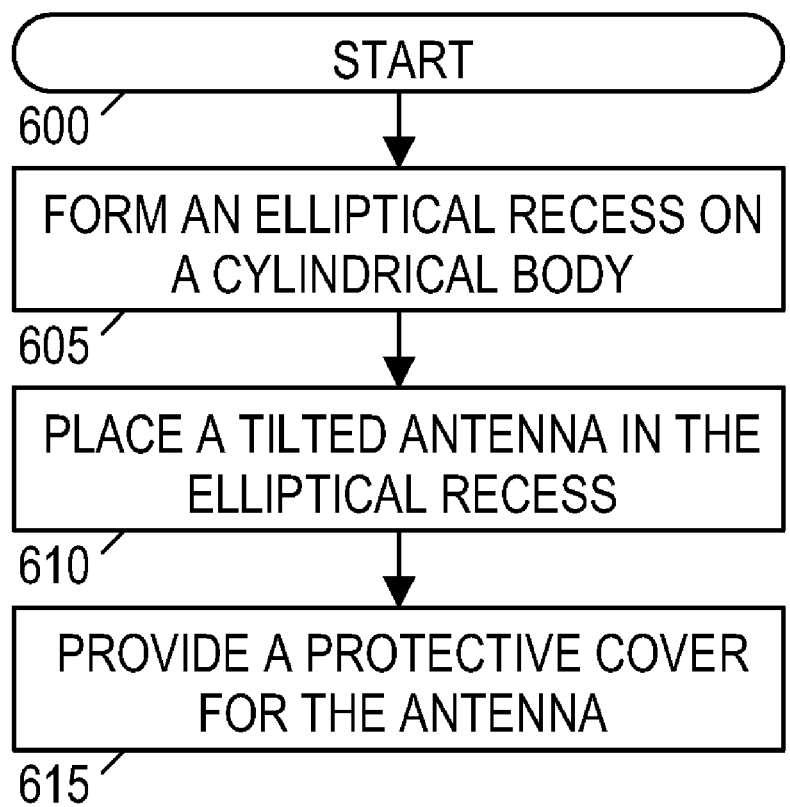
FIG. 6 is a flowchart of an illustrative tilted antenna manufacturing method.

FIG. 6 illustrates a technique for building a tilted antenna on a retrievable segment of a downhole tool in accordance with some embodiments of the invention. Technique 600 comprises, forming an elliptical recess on the segment, 605, placing an antenna within the elliptical recess, 610, and providing a protective cover for the antenna, 615. The foregoing technique specifies actions that may be interspersed and followed by additional actions to produce a functional resistivity tool.

Forming an elliptical recess on the segment 605, comprises, in some embodiments, forming an elliptical channel in a segment. In other embodiments, it comprises forming an elliptical recess between raised bands on a segment. The angle of the elliptical recess relative to the axis of the segment may vary from one application to the next. As previously disclosed, the shape and dimensions of every elliptical recess may vary from one implementation to the next.

Placing a tilted antenna within the elliptical recess 610, comprises, in some embodiments, creating an elliptical antenna having multiple loops of wire contained in a planar coil housing, gently distorting the coil housing to pass the antenna over the segment body to the recess, reshaping and supporting the coil housing within the recess, coupling the antenna to the electronics, placing the electronics in a hermetically sealed cavity, and surrounding the antenna with filler material to support and protect the antenna.

Providing a protective cover for the tilted antenna 615 includes creating a cover having a window pattern that aligns with the elliptical recess and the tilted antenna, and fixing the cover in place over the elliptical recess. The cover should comprise a rigid, wear-resistant material such as steel. The pattern of windows is designed to permit the antenna to function with relatively little loss. The windows perform this operation by preventing current flow through the cover in the plane of the antenna, e.g., by providing window edges that run perpendicular to the plane of the antenna.

In other embodiments, block 615 may comprise forming windows in the segment and creating voids between windows. In embodiments where windows are formed within the segment as opposed to a cover, 615 may merge with 605. However, a cover having windows may still be utilized to absorb the majority of wear and tear.

It is noted that the sleeve 300 and individual antenna cover 550 embodiments enable the logging while drilling tool to have a spacing distance between two tilted antennas of less than the vertical dimension of the sleeve or cover.

While the present invention has been described with respect to a limited number of embodiments, those skilled in the art will appreciate numerous modifications and variations therefrom. It is intended that the appended claims cover all such modifications and variations as fall within the true spirit and scope of the present inventions.

What is claimed is:

1. A method of building a tilted antenna on a retrievable segment of a tool, comprising:
    forming an elliptical recess on the segment;
    forming an antenna within the elliptical recess; and
    forming a pattern of windows over and perpendicular to the plane of the elliptical antenna.

2. The method of claim 1, wherein the elliptical recess is formed at an angle measuring 45 degrees from the axis of the segment.

3. The method of claim 1, wherein the pattern of windows is formed on a cover positioned over at least a portion of the segment.

4. The method of claim 1, wherein the windows are equally spaced and have equal dimensions.

5. The method of claim 1, wherein a plurality of antennae are disposed within the elliptical recess.

6. The method of claim 1, wherein the antenna comprises a variable electromagnetic antenna.

7. A logging while drilling tool comprising:
    a cylindrical body having a tilted recess around its circumference;
    a tilted antenna disposed within the recess; and
    a cover over the recess having a pattern of windows aligned with the tilted antenna,
    wherein the windows have edges perpendicular to the plane of the tilted antenna.

8. The tool of claim 7, wherein the segment comprises a plurality of tilted recesses having at least one antenna disposed in each tilted recess.

9. The tool of claim 8, wherein at least two tilted recesses are formed at different angles relative to the axis of the retrievable segment.

10. The tool of claim 7, wherein the windows are equally spaced and have equal dimensions.

11. The tool of claim 7, wherein the tilted recess comprises shoulders for supporting a cover.

12. The tool of claim 7, wherein at least one support is positioned between the recess and cover.

13. The tool of claim 12, wherein the at least one support comprises a structural, insulative, antenna guide, spacer, volume filler, connector, or electronic component.

14. The tool of claim 7, wherein the windows vary in size and shape.

15. A retrievable downhole tool that comprises:
    at least one tilted antenna at least partly protected beneath one or more conductive surfaces having windows or gaps aligned with the tilted antenna,
    wherein the window or gap edges nearest to the tilted antenna are oriented to substantially minimize current flow in a plane containing the tilted antenna.

16. The tool of claim 15, wherein the windows or gaps have a dimension perpendicular to the plane of the antenna, and wherein that dimension is no more than about ten centimeters.

17. The tool of claim 15, wherein said downhole tool comprises a cylindrical body having an outer surface, and wherein said one or more conductive surfaces are part of said outer surface, and wherein said windows are formed in the walls of said cylindrical body.

18. The tool of claim 15, wherein said one or more conductive surfaces are metal bars set across a tilted recess that contains the at least one tilted antenna.

19. The tool of claim 15, wherein said one or more conductive surfaces comprise a sleeve that fits over multiple tilted antenna recesses.

20. The tool of claim 15, wherein said one or more conductive surfaces comprise a cover sized to fit one tilted antenna recess.

* * * * *